United States Patent
Crook et al.

(10) Patent No.: US 12,377,920 B1
(45) Date of Patent: Aug. 5, 2025

(54) ADAPTIVE VEHICLE AERODYNAMICS FOR DOWNFORCE

(71) Applicant: Tesla, Inc., Austin, TX (US)

(72) Inventors: James Michael Arthur Crook, Winchester (GB); Christopher Ward, Culver City, CA (US); David Lemire, Redondo Beach, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 19/193,270

(22) Filed: Apr. 29, 2025

(51) Int. Cl.
*B62D 37/02* (2006.01)
*B62D 35/02* (2006.01)
*F15D 1/00* (2006.01)

(52) U.S. Cl.
CPC .............. *B62D 37/02* (2013.01); *B62D 35/02* (2013.01); *F15D 1/008* (2013.01)

(58) Field of Classification Search
CPC .......... B62D 35/02; B62D 37/02; F15D 1/008
See application file for complete search history.

(56) References Cited

U.S. PATENT DOCUMENTS

| | | | | |
|---|---|---|---|---|
| 9,994,267 B1 * | 6/2018 | Marmo | ................... | B62D 37/02 |
| 2013/0238198 A1 * | 9/2013 | Prentice | ................. | B62D 35/02 |
| | | | | 296/180.1 |
| 2015/0197291 A1 * | 7/2015 | Roush | .................. | B62D 35/001 |
| | | | | 296/180.4 |
| 2016/0121941 A1 * | 5/2016 | D'Arcy | ................ | B62D 35/005 |
| | | | | 296/180.5 |
| 2019/0002039 A1 * | 1/2019 | Cha | ......................... | G01S 19/42 |

FOREIGN PATENT DOCUMENTS

GB 2591050 A * 7/2021 ............. B62D 35/02

OTHER PUBLICATIONS

WO 2019026908 A1 (Year: 2019).*

* cited by examiner

*Primary Examiner* — Lori Lyjak
(74) *Attorney, Agent, or Firm* — Schwegman Lundberg & Woessner, P.A.

(57) ABSTRACT

A vehicle aerodynamic system with dual operating modes to modify downforce across varying speed ranges and driving conditions. The system comprises multiple fans positioned in airflow pathways and deployable skirts that interact with the ground surface. In a first mode, a complete set of skirts creates a fully sealed bounded region under the vehicle with central fans generating maximum downforce at low speeds on smooth surfaces. In a second mode, a subset of skirts (primarily side skirts) modifies the bounded region while all fans operate to provide downforce in dynamic driving conditions with uneven surfaces. The system includes a control mechanism to selectively deploy skirts and operate fans based on driving conditions, optimizing between maximum downforce at low speeds and improved performance over varying terrain at higher speeds.

20 Claims, 5 Drawing Sheets

FIG. 5

ADAPTIVE VEHICLE AERODYNAMICS FOR DOWNFORCE

TECHNICAL FIELD

The present disclosure relates generally to vehicle aerodynamics, and more particularly to adaptive systems for improving vehicle performance. Specifically, disclosed examples relate to active aerodynamic elements that can dynamically adjust to enhance vehicle characteristics under various driving conditions.

BACKGROUND

Vehicle aerodynamics presents various challenges across different operating conditions. Performance vehicles utilize various approaches to manage airflow characteristics. Aerodynamic effects can vary significantly based on vehicle speed, terrain conditions, and driving scenarios. Different approaches to aerodynamic management have different performance characteristics depending on the operating environment.

BRIEF DESCRIPTION OF THE DRAWINGS

Throughout the drawings, reference numbers may be re-used to indicate correspondence between referenced elements. The drawings are provided to illustrate examples of the subject matter described herein and not to limit the scope thereof.

DETAILED DESCRIPTION

According to certain examples, the present disclosure provides a multi-mode powered aerodynamics system for vehicles to increase downforce generation across various driving conditions. The system utilizes a combination of selectively deployable skirts and fans to create and control low-pressure regions beneath the vehicle, thereby increasing tire grip and vehicle performance. This system seeks to address the limitations of existing powered aerodynamic solutions by providing adaptable configurations that can be modified for different driving scenarios, from smooth straight-line acceleration to dynamic driving over varying terrain.

In at least one example, the vehicle aerodynamic system includes a plurality of fans positioned in airflow pathways, a plurality of selectively deployable skirts configured to interact with the ground surface, and a control system that manages the operation of both the fans and skirts. The system can be configured to operate in multiple modes, each optimized for specific driving conditions and performance requirements.

The system operates by creating bounded (e.g., sealed or partially-sealed) regions beneath the vehicle through the selective deployment of skirts that interact with the ground surface. Fans positioned in airflow pathways that extend to these bounded regions generate low pressure within these areas by extracting air, creating downforce that enhances vehicle grip and stability (e.g., by creating a vacuum, or partial vacuum in the bounded regions). The control system manages the transition between different operating modes by adjusting skirt deployment and fan operation based on driving conditions.

In some examples, the system includes a plurality of fans positioned in airflow pathways. For example, the system may utilize four fans, with two central fans and two outboard fans. The central fans may be positioned such that their airflow pathways extend to a bounded region defined by the fully deployed skirts, while the outboard fans may operate outside this bounded region. The fans may be of various diameters and power ratings, depending on the specific requirements of the vehicle and the desired performance characteristics.

In some examples, the system includes multiple sets of skirts that can be selectively deployed to interact with the ground surface. In one example, these include side skirts that run along the sides of the vehicle, and front and rear skirts that can complete the bounded region. The skirts may include hinge assemblies or extension mechanisms that allow them to be deployed, retracted, or positioned at intermediate states between fully deployed and fully retracted. The skirts can be designed to maintain proximity to the ground surface, while being durable enough to withstand operating conditions. The skirts can incorporate materials and mechanisms that allow them to operate effectively across different deployment positions and heights to optimize aerodynamic sealing based on specific operating requirements and conditions. In some examples, the skirts may make direct physical contact with the ground. In some examples, the skirts may be designed to maintain a controlled proximity to the ground surface while minimizing direct contact, though intermittent contact may occur based on driving conditions, terrain variations, vehicle dynamics, or specific operating modes. The skirts may incorporate flexible materials and adaptive geometries to accommodate different interaction requirements across the various operating conditions.

The skirts may be deployed and retracted through various mechanisms. In some examples, the skirts may incorporate hinge assemblies that enable rotational deployment from a stowed position to engage with the ground surface. For example, the skirts may utilize extension mechanisms that allow for linear deployment movements. The deployment mechanisms can include actuators, position sensors, and control interfaces to enable precise control of deployment positions. These mechanisms may be configured to allow for both full deployment and partial deployment to intermediate positions between fully deployed and fully retracted states. The hinge assemblies or extension mechanisms can be selectively controlled by the control system to achieve desired skirt configurations based on operating modes and driving conditions.

In some examples, the control system manages the operation of both the fans and the skirts based on various inputs and predetermined operating modes. The control system may receive inputs from sensors that detect vehicle speed, wheel position, vehicle pitch and roll, GPS location, ground conditions, and/or ground proximity. Based on these inputs, the control system can determine the appropriate operating mode and adjusts the deployment of skirts and the operation of fans accordingly. The control system may also dynamically adjust these parameters during operation to adapt performance as conditions change.

In some examples, the ground proximity detection system utilizes various sensor technologies to measure and monitor the distance between the vehicle and ground surface. For example, the system may incorporate optical sensors such as lasers or cameras, electromagnetic sensors such as mmWave radar, ultrasonic sensors, or combinations thereof positioned at strategic locations on the vehicle underside. The sensors may continuously measure ground clearance and communicate real-time distance data to the control system through the vehicle's communication network. The control system can process this sensor data along with other vehicle dynamics information to determine optimal skirt deployment positions. For example, when approaching uneven terrain or obstacles detected by the proximity sensors, the system may adjust individual skirt positions to maintain optimal ground clearance while preserving aerodynamic performance. The sensor arrangement may include redundant detection methods to ensure reliable operation across different environmental conditions and vehicle operating states.

In some examples, the control system may utilize predictive sensing capabilities to optimize skirt deployment. The system may incorporate various sensors and detection mechanisms to analyze upcoming road conditions, terrain features, and anticipated vehicle dynamics in the vehicle's projected path. Based on this predictive analysis, the control system can dynamically calculate and adjust optimal deployment configurations for individual skirt sections, including deployment heights, angles, and positions. These adjustments may be made to balance multiple factors including maintaining effective aerodynamic sealing while avoiding unnecessary ground contact, accommodating anticipated terrain variations, and preparing for detected upcoming vehicle maneuvers such as cornering events. The system may integrate inputs from GPS location data, terrain mapping, vehicle speed sensors, wheel position sensors, and inertial measurement sensors to enable this predictive optimization of skirt deployment.

In some examples, the control system can operate the fans at different power levels corresponding to specific operating modes, where power levels encompass various operational parameters including fan speed, mass airflow rate, and pressure differential generation capabilities. In the first mode, the fans may operate at a first power level optimized for creating low pressure within the fully bounded region, typically characterized by lower mass flow rates but higher pressure differentials. This first power level may involve specific fan blade positions, rotational speeds, and ducting configurations to maximize pressure reduction within the bounded area. In the second mode, the fans may operate at a second power level configured for increased mass flow, utilizing different blade geometries, higher rotational speeds, or modified ducting arrangements to optimize airflow across the vehicle underside. The system can dynamically adjust these power level parameters based on sensor feedback to maintain optimal aerodynamic performance for each operating mode.

In operation, when the system is in a first mode (e.g., a high downforce mode), the control system deploys a first set of skirts, including both side skirts and front/rear skirts, to create a bounded region beneath the vehicle with greater sealing compared to a second mode. The central fans are activated to create low pressure within this bounded region, generating significant downforce even at low vehicle speeds.

When the system transitions to the second mode (e.g., a downforce mode optimized for varying conditions), the control system may selectively retract or deploy different configurations of skirts and fans based on operation conditions. For example, in this mode, the system may maintain deployment of the side skirts while retracting the front and rear skirts, creating a modified bounded region that allows for increased airflow under the vehicle. The system can activate various combinations of fans, adjust their speeds, modify ducting, etc. to generate enhanced downforce by increasing vacuum at the vehicle underside.

In some examples, the control system can dynamically adjust the configuration based on multiple factors including vehicle speed, GPS location, wheel position data, vehicle pitch, and vehicle roll. In examples, the system may use prestored map data which may characterize a track or a public roadway or may use sensor data to characterize a path for the vehicle (e.g., detecting an imminent turn, hill, pothole, etc.) For example, during existing or anticipated cornering maneuvers, the system may adjust fan speeds or skirt deployments asymmetrically to optimize performance. The transition between modes and specific configurations can be determined based on predetermined operating conditions, sensor inputs, or driver selection.

In this configuration, the system maintains increased downforce while providing improved performance across varying ground and vehicle states. The selective deployment of skirts and variable fan operation allows the system to adapt to dynamic driving conditions while maintaining effective aerodynamic performance.

In some examples, the system may include multiple bounded regions, where a bounded region comprises an area under the vehicle defined by one or more skirts interacting with the ground surface to create a partial or complete seal. For example, the vehicle may have separate bounded regions at the front and rear, allowing for more precise control of downforce distribution.

The system may incorporate various fan configurations including: variable blade fans (e.g., fans with adjustable blade pitch or with variable geometry blades) that can adjust to different operating positions; fans operating at different speeds; and/or fans with multiple blade sets that can be selectively activated based on operating conditions. The fans may include mechanical linkages, speed controls, or blade selection mechanisms that adjust operation in response to signals from the control system.

The control system can dynamically manage these fan configurations across different operating modes. For example, the system may selectively activate specific blade sets, adjust blade geometries, or vary fan speeds based on factors such as vehicle speed, terrain conditions, and desired downforce characteristics. The control system may incorporate adaptive airflow management to dynamically control and optimize the distribution of airflow through the system. For example, this may include actively adjusting airflow routing mechanisms, such as variable geometry ducts, flow control valves, adjustable baffles, or other flow directing elements positioned within the airflow pathways. In some examples, the system can selectively modify airflow distribution to direct low pressure generation from one or more fans to specific bounded regions based on operating requirements. For example, the system may redirect airflow from individual fans to different bounded regions, combine airflow from multiple fans to enhance pressure generation within a single bounded region, or adjust the distribution ratio between multiple bounded regions to optimize downforce characteristics. The airflow pathway system may incorporate converging-diverging sections and specialized geometry to enhance mass flow and pressure characteristics across different operating modes.

Additionally, in some examples, the skirts may be designed to be partially deployable to intermediate positions between fully deployed and fully retracted states, allowing for fine-tuning of the aerodynamic characteristics based on specific driving conditions. For example, when operating on public roads, the system may deploy the side skirts to a partial position that provides enhanced downforce while maintaining adequate ground clearance for road conditions. The control system can calculate optimal intermediate positions based on factors such as vehicle speed, terrain characteristics, and desired downforce levels. The partial deployment capability enables the system to dynamically balance between maximum downforce generation and practical operational considerations.

In some examples, the system may include filtration elements positioned at the inlets of the airflow pathways to prevent debris from entering the fans during operation. For example, the filtration elements may include mesh features to stop rocks from being pulled into the fans, as well as more advanced dust capture and separation systems.

In some examples, the partial deployment capabilities work in conjunction with the system's ability to monitor ground proximity and vehicle dynamics. The control system can adjust deployment positions based on sensor inputs including vehicle speed, GPS location, wheel position data, vehicle pitch, vehicle roll, and data from other sensors such as cameras and proximity detectors across varying driving conditions.

For example, the monitoring and feedback system may incorporate various sensors and detection mechanisms to provide input data to the control system for managing skirt deployment and aerodynamic performance.

Figure 1:
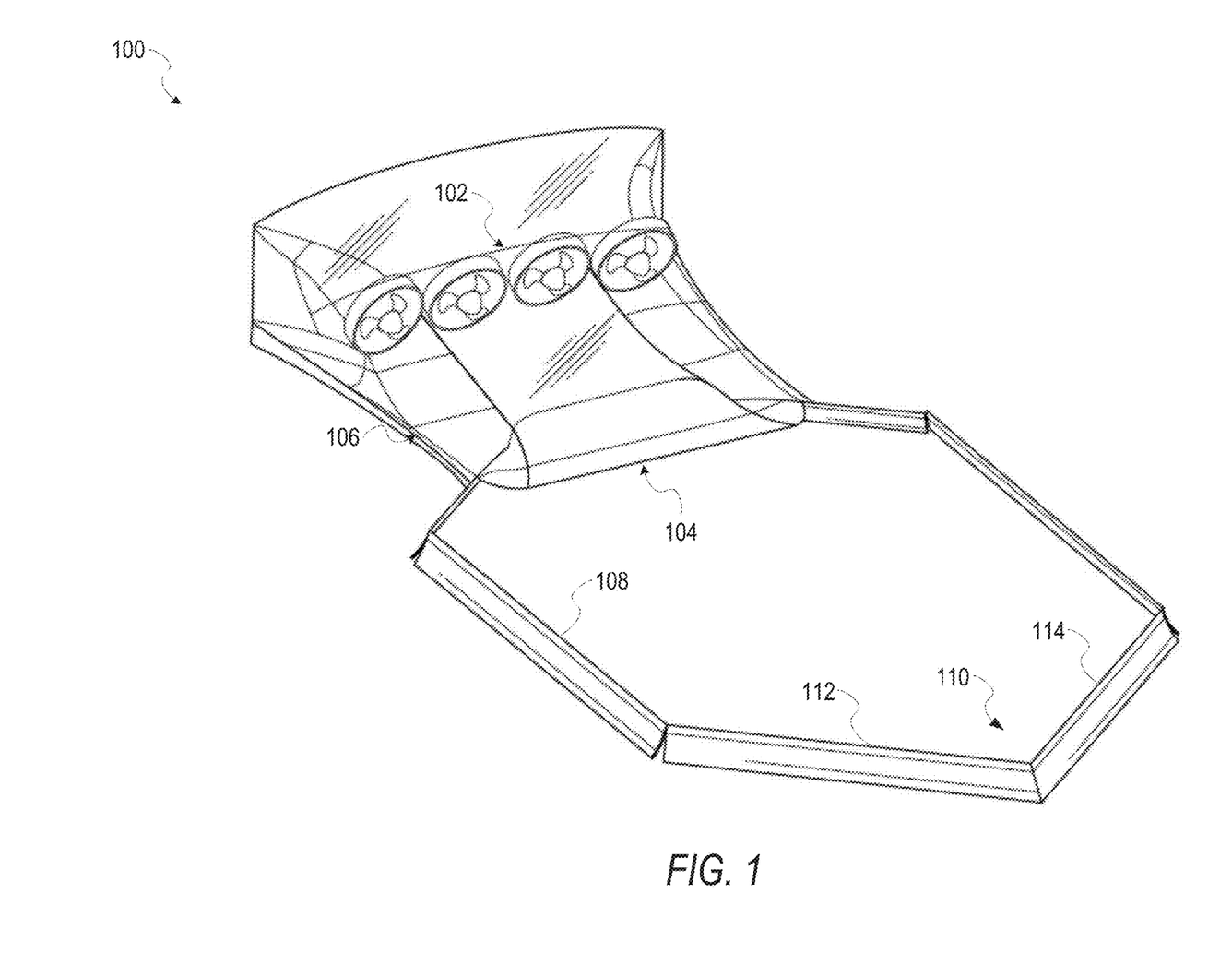
FIG. 1 is a perspective view of an underside of a vehicle incorporating a multi-mode powered aerodynamics system, according to certain examples.

FIG. 1 is a diagram illustrating a multi-mode powered aerodynamics system 100, according to some examples of a vehicle downforce generation apparatus. This figure shows an implementation in the field of active vehicle aerodynamics, aiming to address the challenge of generating downforce across varying speed ranges and terrain conditions. Traditional passive aerodynamic systems generate limited downforce at lower speeds, affecting vehicle performance during acceleration or cornering when enhancing tire grip via downforce can be beneficial. The configuration shown in FIG. 1 demonstrates how fans positioned at various locations working together with selectively deployable skirts can create adjustable bounded regions beneath a vehicle, enabling system 100 to transition between generating downforce at low speeds on smooth surfaces and maintaining downforce over varying terrain at higher speeds. This adaptive approach provides a different way to implement powered aerodynamics systems, offering vehicle handling characteristics across a range of driving conditions.

The system 100 is shown to include a fan assembly 102, a central airflow pathway 104, an outboard airflow pathway 106, a side skirt 108, and a front skirt 110.

Figure 2:
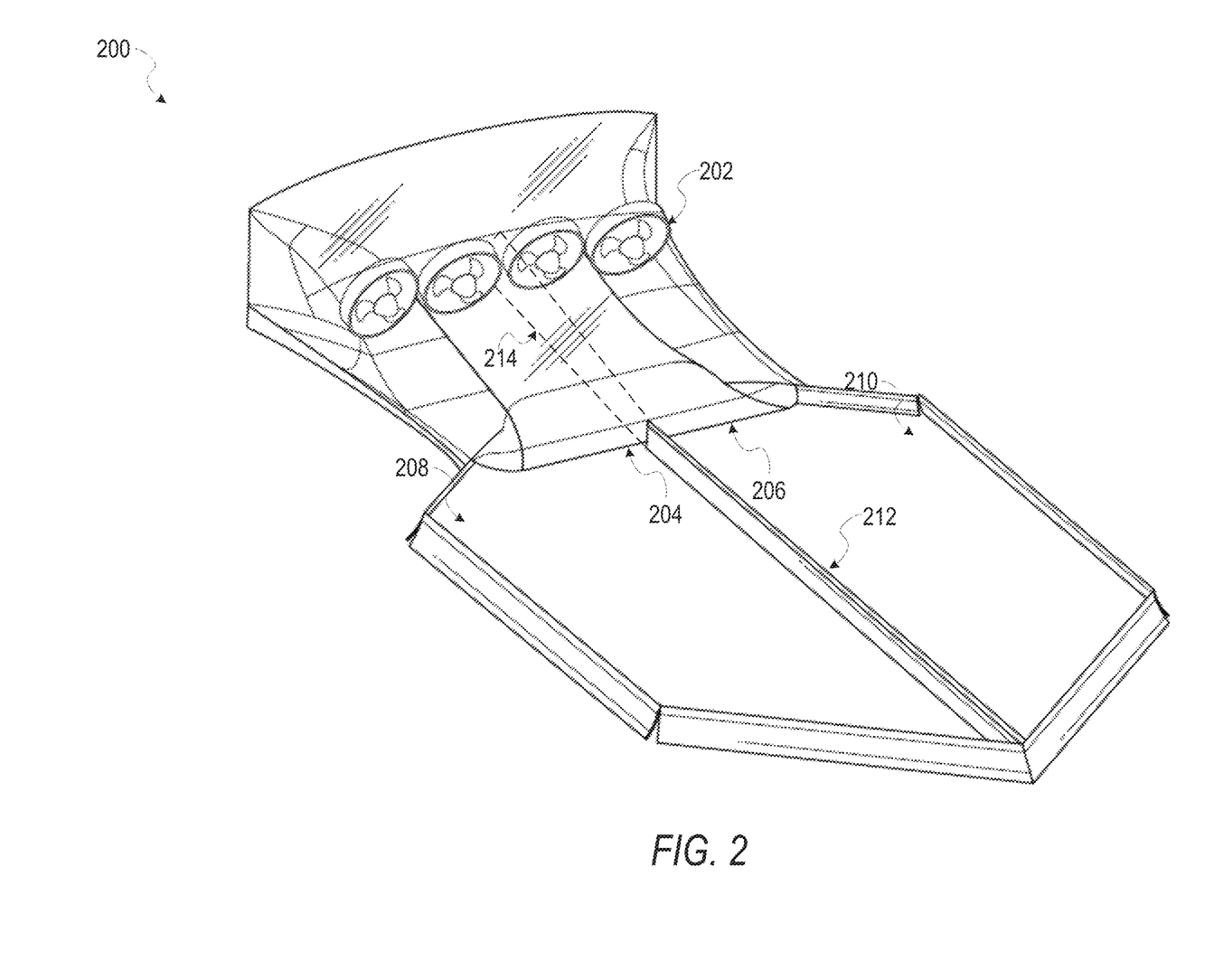
FIG. 2 is a perspective view of an underside of a vehicle incorporating a multi-mode powered aerodynamics system with multiple bounded regions, according to certain examples.

The fan assembly 102 comprises multiple fans positioned on the vehicle underside. In some examples, this fan assembly 102 may include multiple individual fan units housed within an aerodynamically shaped enclosure designed to enhance airflow characteristics while minimizing drag effects. The fans can be configured with variable speed capabilities to adjust downforce generation based on vehicle operating conditions. In certain examples, the system 100 may use four fans, with two central fans and two outboard fans positioned to enhance airflow for different operating modes. As shown in FIG. 2 and discussed below, these fans may be arranged in various configurations to create distinct pressure zones beneath the vehicle.

A central airflow pathway 104 extends from the central fans of the fan assembly 102. This pathway may extend to a bounded region under the vehicle, allowing the central fans to create a low-pressure zone within this region when operating in a first mode. In some examples, the airflow pathway can incorporate flow-optimization features such as curved transitions and aerodynamic surfaces to maximize airflow efficiency and pressure differential generation. The central airflow pathway can be specifically designed to extend into the bounded region created by fully deployed skirts to generate maximum downforce at low speeds. This configuration works can work in conjunction with the multiple bounded regions shown in FIG. 2, where airflow pathways 204 and 206 serve similar functions for their respective bounded regions.

An outboard airflow pathway 106 corresponds with one of the outboard fans. This outboard airflow pathway may be positioned toward a lateral edge of the vehicle and can be designed to optimize airflow characteristics in a second operating mode. The pathway may incorporate specialized geometry to enhance mass flow when the system operates in configurations where not all skirts are fully deployed. In some examples, the outboard airflow pathway contributes to the mass flow configuration when operating in the second mode, which is optimized for varying operating conditions such as higher speeds or uneven terrain. This arrangement complements the multiple airflow pathways (302, 304) shown in FIG. 3, which are configured to direct airflow to specific areas of the vehicle underside.

In some examples, the skirts may each utilize different materials and/or construction methods for different skirt sections based on their operational requirements. For example, the side skirts that remain deployed during high-speed operation over varying terrain may incorporate more durable materials or protective features compared to the front and rear skirts that are retracted in such conditions. The system can also include different deployment mechanisms and ground interaction features optimized for the specific function of each skirt section.

Figure 4:
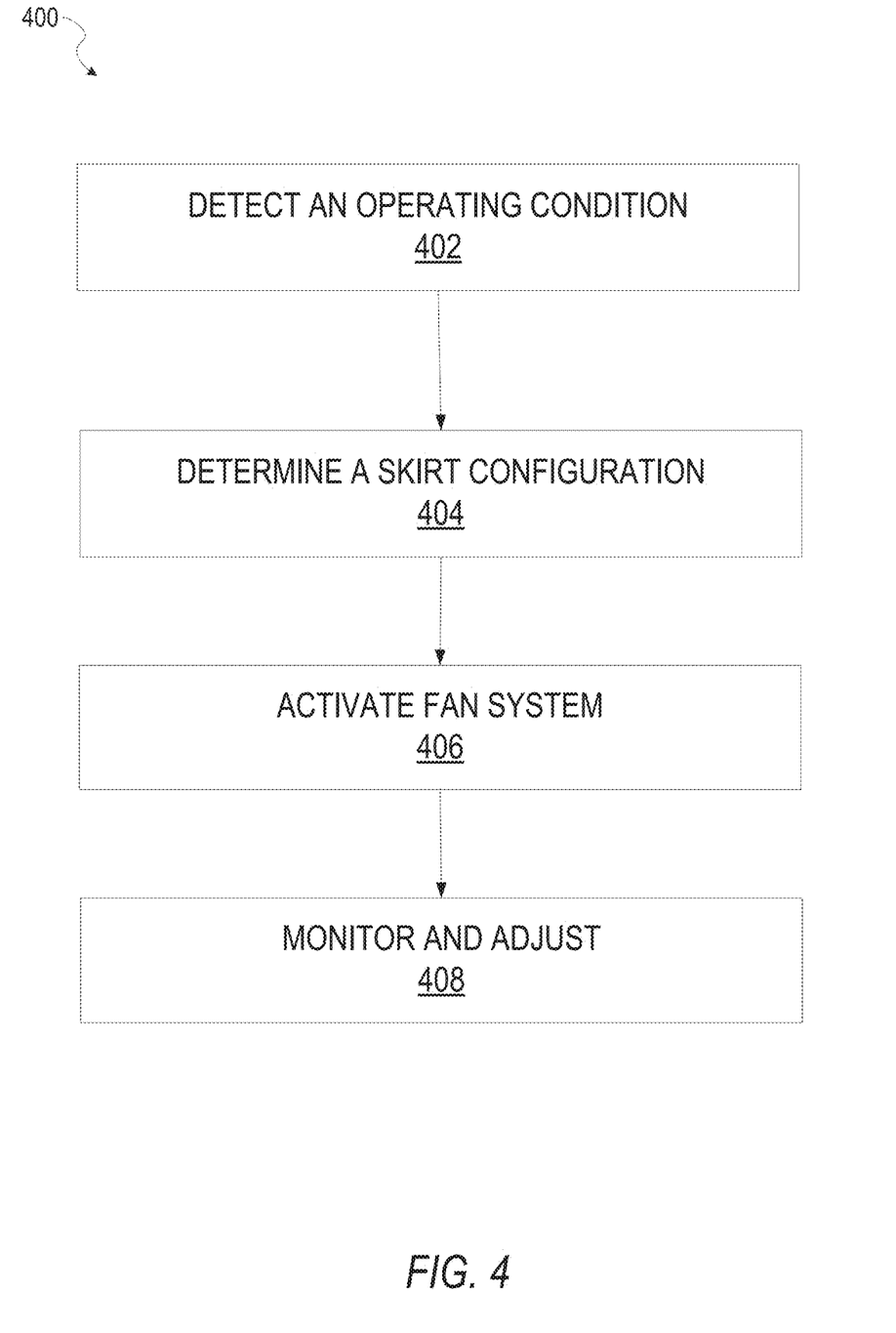
FIG. 4 is a flow diagram illustrating a method of operating a multi-mode powered aerodynamics system, according to certain examples.

A side skirt 108 extends along the longitudinal side of the vehicle. The side skirt helps define the lateral boundary of the bounded region under the vehicle and may remain deployed in multiple operating modes. In some examples, the side skirt can incorporate flexible materials at the ground-contact surface to maintain effective sealing across varying terrain while minimizing wear. According to certain examples, these side skirts remain deployed in both the first and second operating modes to maintain some level of downforce enhancement even when other skirts are retracted. As illustrated in FIG. 4, the determination of skirt configuration (operation 404) is a helpful step in the system's operational flow, following the detection of operating conditions (operation 402).

A front skirt 110, which may comprise one more portions including a front skirt portion 112 and a front skirt portion 114, extends across the front portion of the vehicle underside. This front skirt, together with a corresponding rear skirt and the side skirts, can create a bounded low-pressure region when deployed in the first operating mode. The front skirt may be implemented as a single continuous piece or as multiple separate sections that work together to create the bounded region. The front skirt 110 may be selectively deployed or retracted based on the operating mode, with the control system managing its position.

In some examples, the front skirt can incorporate actuation mechanisms that allow for partial deployment to intermediate positions based on specific operating conditions. The control system may calculate partial deployment positions based on factors such as vehicle speed, terrain characteristics, and desired downforce levels.

The selective deployment of this front skirt is a useful aspect of transitioning between the first operating mode (high downforce mode) and the second operating mode (optimized for varying terrain). This selective deployment capability is part of the comprehensive control system illustrated in FIG. 4, which monitors and adjusts the system configuration (operation 408) based on changing conditions.

The central airflow pathway 104 extends into the bounded region created by the deployed skirts, while the outboard airflow pathway 106 is positioned outside the side skirts to optimize mass flow when operating in the second mode. This arrangement allows the system to dynamically adjust between maximizing downforce in low-speed conditions and optimizing performance across varying terrain and higher speeds. The outboard fans and their intake pathways are specifically positioned toward the lateral edges of the vehicle, outside the bounded region defined by the side skirts (e.g., side skirt 108), to enhance mass flow characteristics when operating in configurations where the front and rear skirts are retracted.

In some examples, the system 100 can be controlled by a control system that determines the appropriate operating mode based on various inputs including vehicle speed, GPS location, wheel position sensor data, vehicle pitch, vehicle roll, onboard sensor data, and prestored track/road information including map data. The control system can also utilize data from cameras, proximity sensors, and other detection mechanisms to monitor vehicle and ground conditions. As shown in FIG. 4, this control process involves a systematic approach of detecting conditions, determining configurations, activating systems, and continuous monitoring for effective performance.

The monitoring and feedback system incorporates these various sensors and data inputs to provide comprehensive information to the control system for managing aerodynamic performance. The system can process both real-time sensor data and stored information about tracks and road conditions to optimize the deployment of skirts and operation of fans across different driving scenarios.

FIG. 2 is a diagram 200 depicting a multi-mode powered aerodynamics system, according to certain examples. The diagram 200 illustrates an example with multiple bounded regions.

Reference numeral 202 indicates a set of fans positioned at various locations on the vehicle. While the diagram 200 shows them all in one assembly, in certain examples they can be positioned based on packaging constraints and corresponding ducting pathways. In some examples, these fans may be arranged in a specific configuration to create distinct pressure zones beneath the vehicle. For example, individual fans among the fans 202 may be selectively activated based on the current operating mode of the multi-mode powered aerodynamics system, such as activating only central fans in the first mode and all fans in the second mode.

An airflow pathway 204 corresponds to one or more of the bounded regions. This airflow pathway channels airflow from one or more fans in the set 202 to create low pressure within its corresponding bounded region. In some examples, each airflow pathway may have its own dedicated fans, optimized for operating conditions requiring different pressure characteristics. For example, the fan assembly 202 may include one or more partitions 214 (represented by dotted lines) positioned between individual fans from among the set 202 to create separated airflow regions. These partitions 214 can be configured to direct airflow from specific fans to their respective bounded regions 208, 210 on either side of the central skirt 212. The partitions 214 may be permanent or selectively deployable to enable different airflow routing configurations based on the operating mode. For example, when present, the partitions 214 help ensure dedicated airflow pathways between specific fans and their corresponding bounded regions to optimize pressure generation and downforce characteristics.

A further airflow pathway 206 corresponds to the second bounded region. This airflow pathway 206 similarly channels airflow to create low pressure within its corresponding bounded region. As with the first airflow pathway 204, this pathway may utilize dedicated fans tuned for its specific operating characteristics, or in some examples, may share fans with other airflow pathways.

A distinct enclosed or bounded region 208 is created under the vehicle by the deployed skirts deployed skirts, including the central skirt 212. This bounded region 208 experiences controlled low pressure when its corresponding fans are activated, contributing to the overall downforce generation. In some examples, this region can be independently controlled from other bounded regions to optimize downforce distribution.

A second distinct enclosed region 210 is created under the vehicle by the deployed skirts and the central skirt 212. This region can be independently controlled from the first bounded region 208 to optimize downforce distribution across the vehicle underside, as needed based on operating mode (e.g., depending on road conditions and/or vehicle maneuvers).

As seen in the diagram 200, the multiple bounded regions can be configured to operate in different modes based on vehicle operating conditions. In some examples, the operating mode may be determined based on collected sensor data including vehicle speed, GPS location, wheel position sensor data, vehicle pitch, road conditions, suspension component position(s), and vehicle roll. This sensor data enables the system to dynamically adjust the formation of bounded regions and activate appropriate fans to influence vehicle behavior and performance. This configuration builds upon the single bounded region concept shown in FIG. 1, providing enhanced control capabilities that are further expanded in subsequent figures.

For example, during high-speed cornering situations, the system might activate fans asymmetrically between the lateral regions to enhance stability, while selectively deploying or retracting front skirts to optimize aerodynamic performance. During straight-line acceleration, the system might distribute downforce more evenly across all regions while maintaining deployment of both side and front skirts to maximize traction. The control system can independently manage the fan speeds, skirt positions, and bounded region configurations to optimize performance for specific driving conditions.

Figure 3:
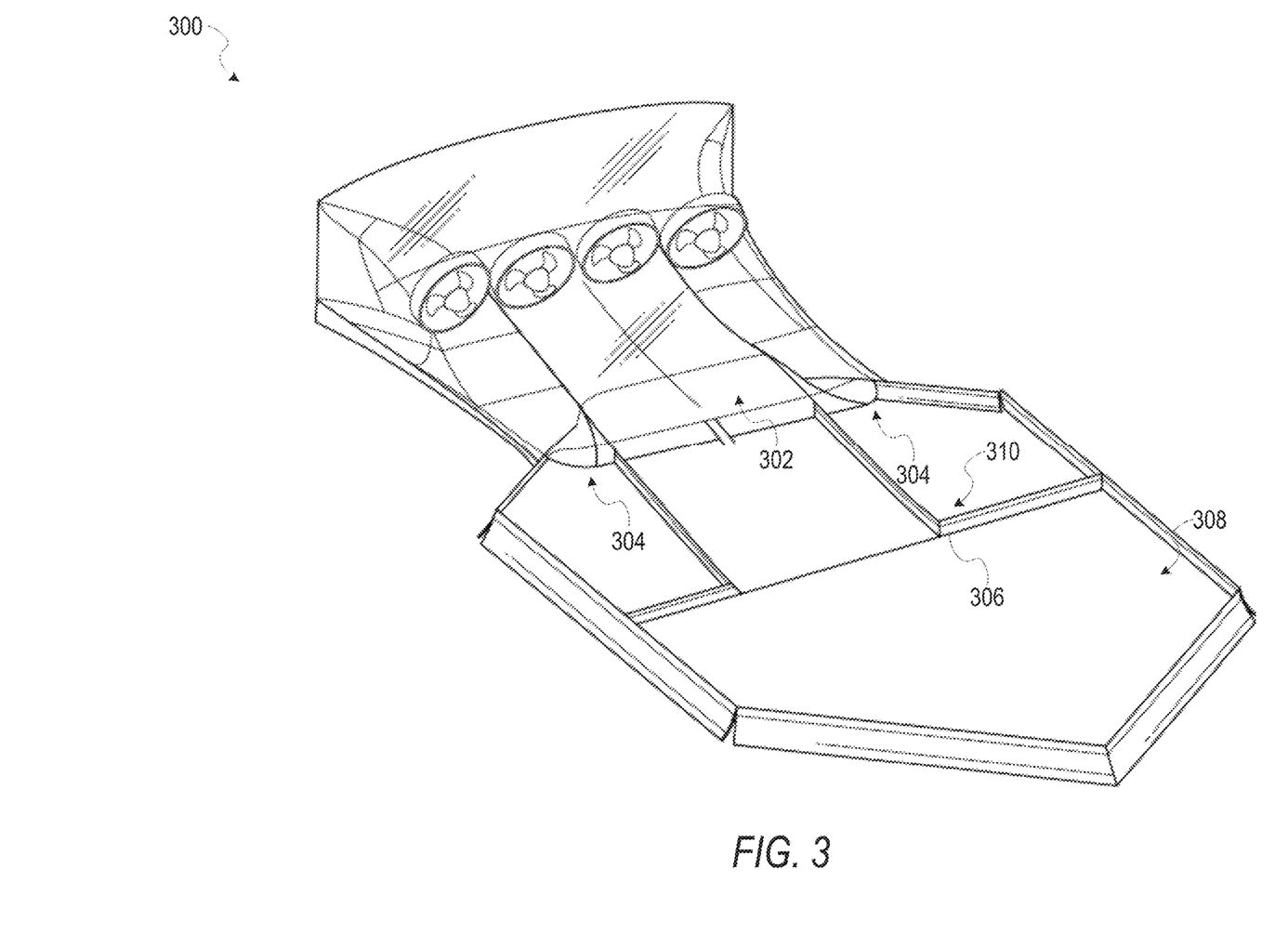
FIG. 3 is a perspective view of an underside of a vehicle incorporating a multi-mode powered aerodynamics system with further multiple bounded region configuration, according to certain examples.

The bounded regions can be configured in multiple ways, including: full deployment of all skirts for maximum downforce at low speeds, selective deployment of side skirts only for high-speed operation, or asymmetric configurations where different combinations of front, rear, and side skirts are deployed to optimize performance for specific maneuvers FIG. 3 is a diagram 300 depicting a multi-mode powered aerodynamics system, according to certain examples. The diagram 300 illustrates a configuration with a plurality of bounded regions formed by a plurality of skirts.

An airflow pathway 302 extends to a specific area of the vehicle underside and may correspond to one of the bounded regions. This airflow pathway 302 may be configured to direct airflow to a specific area of the vehicle underside, such as the front region 308, to create targeted downforce distribution. In some examples, the airflow pathway 302 incorporates a geometry with aerodynamically designed surfaces that can reduce flow resistance while enhancing pressure differential generation. The pathway may feature variable cross-sectional areas along its length to control airflow velocity and pressure characteristics, allowing for control of downforce generation in dynamic driving conditions. This airflow pathway builds upon the central airflow pathway 104 shown in FIG. 1, but with targeting capabilities for more precise control.

For example, the pathway can direct airflow through multiple configurations: it may draw air from within a bounded region created by deployed skirts, pull air from outside the bounded regions through the outboard sections, or operate in combination with other pathways to create targeted downforce distribution patterns.

The system's airflow pathways can be configured to work with different bounded region arrangements, including fully bounded regions with all skirts deployed, partially bounded regions with only side skirts deployed, and asymmetric configurations where pathways may interact with multiple regions simultaneously. For example, outboard pathways positioned near the side skirts can both extract air from within the bounded region and draw additional airflow from outside the bounded area to enhance overall aerodynamic performance.

The control system can selectively manage these airflow interactions to optimize downforce distribution across different vehicle areas, allowing for dynamic adjustment of aerodynamic characteristics based on specific operating conditions and performance requirements. This flexibility in airflow management enables the system to create targeted pressure zones while maintaining efficient overall aerodynamic performance.

Additional airflow pathways 304 that may correspond to control airflow to different areas of the vehicle underside, which may correspond with other bounded regions. These pathways serve as air channels that can be configured to work with single or multiple fans through selective routing mechanisms. In some examples, these airflow pathways may feature computationally designed internal geometries with transition curves and flow directors that can reduce turbulence while enhancing mass flow rates. The pathways may incorporate variable aperture or valving mechanisms that can adjust and selective channel routing that can adjust the effective flow area and airflow distribution based on operating conditions. In some examples, the system may incorporate various fan configurations and arrangements. While certain examples show four fans, the system can be implemented with any number of fans based on specific vehicle requirements and design constraints. Individual fans may have different diameters, power ratings, and operational characteristics optimized for their intended functions. Multiple fans may be configured to service a single bounded region to enhance pressure generation and provide redundancy, or individual fans may be ducted to service multiple bounded regions through specialized airflow pathways. The fans may incorporate variable blade mechanisms to adjust performance characteristics, and fan specifications such as diameter, blade geometry, and motor power can be selected to optimize performance for specific operating modes. The system may utilize different combinations of central and outboard fans, with some fans optimized for operation with fully bounded regions while others are configured for enhanced mass flow in partially bounded configurations. Fan placement and ducting arrangements can be adapted based on vehicle packaging constraints, suspension geometry, and other design requirements.

Multiple deployable skirts 310, such as the skirt 306, define the various bounded regions under the vehicle. These skirts function as movable barriers that create bounded (e.g., sealed or partially sealed) areas beneath the vehicle. In some embodiments, the skirts 310 may incorporate composite materials with a structural core and flexible ground-contact elements that provide both durability and conformability to varying surface conditions. The system may includes pressure sensors positioned within the bounded regions and/or on the underside of the vehicle that provide feedback on sealing effectiveness and pressure conditions. This sensor data allows the control system to dynamically adjust fan speed, blade geometry, duct routing, and skirt positions based on inputs including vehicle speed, GPS location, wheel position data, vehicle pitch, vehicle roll, etc., as outlined in the operational flow of FIG. 4.

When one or more of the skirts 310 are deployed and the central fans are activated through their respective airflow pathways, the system 300 may create more downforce at the front of the vehicle. This configuration creates a pressure differential that can enhance vertical force on the front wheels. In some embodiments, the ability to target downforce distribution may involve pressure mapping algorithms that calculate fan speeds and skirt positions based on vehicle dynamics data, enabling precise adjustment of aerodynamic characteristics during different driving maneuvers such as braking, accelerating, and cornering.

Alternatively, when the skirts 306 are deployed and different fans are activated through their respective airflow pathways, the system 300 can create more downforce at the rear of the vehicle. This configuration shifts the aerodynamic balance toward the rear axle. In some examples, this rear-biased configuration may use differential fan speeds between front and rear units, with rear fans potentially operating at higher power levels to create low-pressure zones beneath the rear portion of the vehicle, which can be useful for scenarios requiring enhanced rear-end stability or launch control conditions. The control system can dynamically adjust fan speeds and power levels to optimize downforce distribution based on specific performance requirements, including maximizing traction during acceleration from a standstill.

In some examples, when a subset of the skirts 310 are retracted, the system operates in a mode that provides downforce across the entire bounded region 308. This configuration allows for increased mass airflow under the vehicle while maintaining some pressure differential. In some embodiments, this mode may utilize variable-pitch fan blades that can adjust their angle of attack based on airflow conditions, helping to optimize efficiency across different vehicle speeds and terrain types.

FIG. 4 is a flow diagram 400 illustrating a method of operating the multi-mode powered aerodynamics system, according to certain examples. The flow diagram 400 depicts a sequence of operations that the system performs to increase downforce generation based on various operating conditions.

At operation 402, the system collects and analyzes data from various sensors to determine the current operating environment of the vehicle. These operating conditions may include vehicle speed, track type, surface conditions, GPS location, wheel position sensor data, vehicle pitch, and vehicle roll. For example, the system may detect whether the vehicle is performing a straight-line acceleration on a smooth surface or navigating a bumpy racetrack with varying terrain. The control system may use GPS location to identify specific track sections or road conditions that require particular skirt configurations.

At operation 404, based on the detected operating conditions, the system determines a configuration of the deployable skirts. For low-speed, smooth surface conditions such as 0-60 sprints or autocross events, the system may select the first mode with all skirts deployed (e.g., both side skirts and front/rear skirts) to create a bounded low-pressure region (e.g., a fully sealed bounded region). For high-speed operation or uneven terrain, the system may select the second mode with only side skirts deployed to allow for improved passive aerodynamics while maintaining some downforce enhancement.

At operation 406, after determining the appropriate skirt configuration, the system activates the corresponding fan system. For example, in the first mode (fully sealed bounded region), the system may activate primarily the central fans to create low pressure within the bounded region, generating downforce at low speeds. In the second mode (side skirts only), the system may activate all fans, including both central and outboard fans, to increase mass flow under the vehicle floor and supplement the passive aerodynamics.

At operation 408, the system continuously monitors vehicle conditions (e.g., using sensors and/or stored map data) and performance parameters to make real-time adjustments as needed. This may include adjusting fan power levels based on downforce requirements, fine-tuning skirt deployment positions based on changing terrain, or potentially transitioning between operating modes if conditions change significantly.

In certain examples, the operations depicted in flow diagram 400 may be performed continuously during vehicle operation, allowing the system to respond to changing conditions in real-time. Alternatively, the system may allow the driver to manually select an operating mode at the beginning of a driving session based on anticipated conditions, with the system then optimizing performance within that selected mode.

Figure 5:
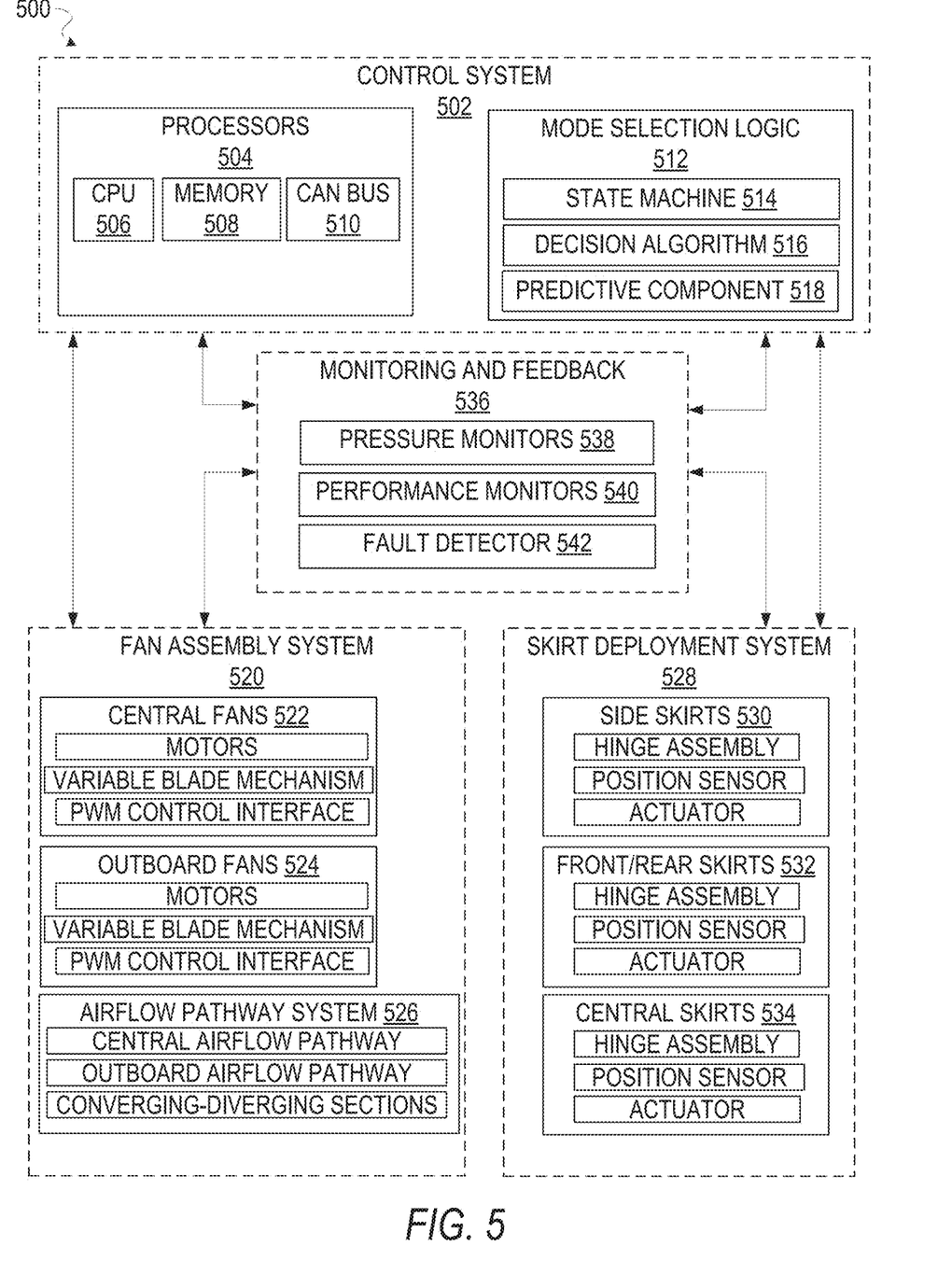
FIG. 5 is a block diagram depicting a control system architecture for a multi-mode powered aerodynamics system, according to certain examples.

FIG. 5 illustrates a block diagram 500 depicting the control system architecture for a multi-mode powered aerodynamics system, according to certain examples.

The control system 502 comprises a processor subsystem 504 that in some examples may include a CPU 506 implemented as an automotive-grade microcontroller operating at 400-800 MHZ, memory 508 with 256 KB flash and 128 KB RAM storage capacity, and a CAN bus interface 510 operating at 500 kbps for vehicle network communications. This processor subsystem enables real-time processing of sensor data and control of the aerodynamic system components.

The mode selection logic 512 implements a state machine 514 with hysteresis parameters to manage transitions between operating modes, a decision algorithm 516 that processes sensor inputs against defined thresholds, and a predictive component 518 that utilizes GPS and map data to anticipate changes in operating conditions. For example, the system can predict approaching varying terrain and prepare appropriate mode transitions.

In some examples, the fan assembly system 520 may include central fans 522 equipped with motors for downforce generation in the first mode, and outboard fans 524 with capabilities optimized for the second operating mode. In some examples, each fan incorporates variable blade mechanisms and PWM control interfaces operating at 12-bit resolution and 25 kHz for precise airflow control.

The airflow pathway system 526 comprises central pathways that extend into the bounded region and outboard pathways positioned toward the vehicle sides, with converging-diverging sections having area ratios between 1.2:1 and 2:1 to optimize flow characteristics.

In some examples, the skirt deployment system 528 manages three distinct mechanisms: side skirts 530, front/rear skirts 532, and central skirts 534. Each mechanism incorporates hinge assemblies or extension mechanisms for deployment control, position sensors for accurate feedback, and actuators for precise movement. The system enables both full deployment for downforce generation and partial deployment for intermediate operating conditions.

The monitoring and feedback system 536 incorporates various sensors including pressure monitors 538 that measure conditions within the bounded regions, performance monitors 540 that track fan motor current draw and skirt position accuracy, and a fault detector 542 that identifies sensor failures and mechanical issues.

The system implements multiple connection flows. For example: data connections linking sensors through the interface module to the processor subsystem and control signals to fan motors and skirt actuators; physical connections between fan assemblies, airflow pathways, and bounded regions; control flows managing operating mode transitions; and user interface connections enabling driver control and feedback through dashboard indicators and diagnostic data logging.

EXAMPLES

Some examples may include one or more of the following aspects.

Example 1 is a vehicle aerodynamic system comprising: one or more fans positioned in airflow pathways of a vehicle, at least one airflow pathway extending to a bounded region under the vehicle; a plurality of skirts configured to selectively operatively couple with a ground surface to define the bounded region under the vehicle; a control system configured to operate the vehicle aerodynamic system in: a first mode having a first set of skirts from among the plurality of skirts deployed in a first configuration to create the bounded region under the vehicle with a first fan from among the one or more fans operating through a respective airflow pathway to create low pressure within the bounded region; and a second mode having the plurality of skirts form a second configuration different from the first configuration and with at least one of the first fan or a second fan from among the one or more fans operating through a respective airflow pathway.

In Example 2, the subject matter of Example 1, wherein in the second configuration, the plurality of skirts comprises side skirts deployed to interact with the ground surface while front and rear skirts are retracted.

In Example 3, the subject matter of Example 1, further comprising: a second bounded region under the vehicle defined by a second set of skirts; and a fan from among the one or more fans positioned in an airflow pathway extending to the second bounded region; wherein the control system is further configured to selectively operate the fan to create low pressure within the second bounded region.

In Example 4, the subject matter of Examples 1-3, further comprising a an assembly to selectively retract or deploy one or more skirts from among the plurality of skirts based on an operating mode defined by the control system.

In Example 5, the subject matter of Examples 1-4, wherein the plurality of skirts includes an extension mechanism to selectively retract or deploy one or more skirts from among the plurality of skirts based on an operated mode controlled by the control system.

In Example 6, the subject matter of Examples 1-5, wherein the plurality of skirts are configured to be partially deployed to intermediate positions between a deployed state and a retracted state, and wherein the intermediate positions are determined based on an operating mode defined by the control system.

In Example 7, the subject matter of Examples 1-6, wherein the control system is configured to: determine the operating mode from a plurality of operating modes based on one or more operating conditions; calculate a partial deployment position for at least one of the plurality of skirts based on the operating mode; and actuate the at least one of the plurality of skirts to the partial deployment position.

In Example 8, the subject matter of Examples 1-7, wherein the control system is configured to deploy or retract the plurality of skirts based on one or more of: GPS location; a current vehicle speed; wheel position sensor data; vehicle pitch; or vehicle roll.

In Example 9, the subject matter of Examples 1-8, further comprising a ground proximity detection system configured to: measure a distance between the vehicle and the ground surface using one or more sensors; communicate the measured distance to the control system, wherein the control system is further configured to adjust deployment of one or more of the plurality of skirts based on the measured distance.

In Example 10, the subject matter of Examples 1-9, wherein the control system is configured to operate the first fan at power levels corresponding to: a first power level in the first mode; and a second power level in the second mode.

Example 11 is a method of operating a vehicle aerodynamic system, comprising: receiving, by a control system, sensor data indicating at least one operating condition of a vehicle having one or more fans positioned in airflow pathways, at least one airflow pathway extending to a bounded region under the vehicle; determining, by the control system based on the received sensor data, a skirt configuration for a plurality of skirts that selectively operatively couple with a ground surface; actuating, by the control system, the plurality of skirts based on the determined skirt configuration; activating, by the control system in a first mode, a first fan from among the one or more fans through a respective airflow pathway to create low pressure within the bounded region when the plurality of skirts are in a first configuration; and activating, by the control system in a second mode, at least one of the first fan or a second fan from among the one or more fans through a respective airflow pathway when the plurality of skirts form a second configuration different from the first configuration.

In Example 12, the subject matter of Example 11, wherein activating the control system in the second mode comprises deploying side skirts to operatively couple with the ground surface while maintaining front and rear skirts in a retracted position.

In Example 13, the subject matter of Example 11, further comprising: defining, by the control system, a second bounded region under the vehicle using a second set of skirts; activating, by the control system, a fan from among the one or more fans positioned in an airflow pathway extending to the second bounded region to create low pressure within the second bounded region.

In Example 14, the subject matter of Examples 11-13, wherein actuating the at least one of the plurality of skirts comprises controlling an assembly to selectively retract or deploy the at least one of the plurality of skirts based on the determined skirt configuration.

In Example 15, the subject matter of Examples 11-14, wherein actuating the at least one of the plurality of skirts comprises controlling an extension mechanism to selectively retract or deploy the at least one of the plurality of skirts based on the determined skirt configuration.

In Example 16, the subject matter of Examples 11-15, wherein actuating the at least one of the plurality of skirts comprises partially deploying the at least one of the plurality of skirts to an intermediate position between a deployed state and a retracted state based on the determined skirt configuration.

In Example 17, the subject matter of Examples 11-16, wherein determining the skirt configuration comprises: determining an operating mode from a plurality of operating modes based on the received sensor data; calculating a partial deployment position for at least one of the plurality of skirts based on the operating mode.

In Example 18, the subject matter of Examples 11-17, wherein the received sensor data comprises at least one of: GPS location data; vehicle speed data; wheel position sensor data; vehicle pitch data; or vehicle roll data.

In Example 19, the subject matter of Examples 11-18, wherein: the received sensor data comprises distance measurements between the vehicle and the ground surface; and determining the skirt configuration comprises adjusting deployment positions of one or more of the plurality of skirts based on the distance measurements.

In Example 20, the subject matter of Examples 11-19, wherein: activating the first fan in the first mode comprises operating the first fan at a first power level; and activating the first fan in the second mode comprises operating the first fan at a second power level.

Example 21 is a method of installing a vehicle aerodynamic system on a vehicle, comprising: mounting one or more fans to an underside of the vehicle, wherein the one or more fans are positioned in airflow pathways; securing at least one airflow pathway to extend to a region under the vehicle that is configured to become a bounded region; installing a plurality of skirts along a perimeter of the underside of the vehicle, wherein the plurality of skirts are configured to selectively interact with a ground surface to define the bounded region; coupling the plurality of skirts to deployment mechanisms that enable selective deployment and retraction of the skirts; installing a control system on the vehicle; connecting the control system to the plurality of fans and to the deployment mechanisms of the plurality of skirts; and calibrating the control system to operate the vehicle aerodynamic system in multiple modes.

In Example 22, the subject matter of Example 21, wherein installing the plurality of skirts comprises: mounting side skirts along longitudinal sides of the vehicle; mounting a front skirt across a front portion of the vehicle underside; and mounting a rear skirt across a rear portion of the vehicle underside.

In Example 23, the subject matter of Examples 21-22, wherein coupling the plurality of skirts to deployment mechanisms comprises: attaching hinge assemblies to at least a subset of the plurality of skirts; and connecting the hinge assemblies to actuators controlled by the control system.

In Example 24, the subject matter of Examples 21-23, wherein coupling the plurality of skirts to deployment mechanisms comprises: attaching extension mechanisms to at least a subset of the plurality of skirts; and connecting the extension mechanisms to actuators controlled by the control system.

In Example 25, the subject matter of Examples 21-24, further comprising: installing a central skirt that divides the region under the vehicle into multiple bounded regions; and securing additional airflow pathways to extend to each of the multiple bounded regions.

In Example 26, the subject matter of Examples 21-25, wherein mounting the plurality of fans comprises: mounting central fans in airflow pathways that extend to the bounded region; and mounting outboard fans in airflow pathways positioned toward sides of the vehicle.

In Example 27, the subject matter of Examples 21-26, further comprising: installing a plurality of sensors on the vehicle; connecting the plurality of sensors to the control system; and configuring the control system to receive data from the plurality of sensors for determining skirt configurations.

In Example 28, the subject matter of Examples 21-27, wherein installing the plurality of sensors comprises installing at least one of: vehicle speed sensors; wheel position sensors; inertial measurement sensors for detecting vehicle pitch and roll; GPS location sensors; or ground proximity sensors.

In Example 29, the subject matter of Examples 21-28, wherein installing the control system comprises: mounting a processor subsystem on the vehicle; connecting the processor subsystem to a power source of the vehicle; installing memory storage containing instructions for operating the vehicle aerodynamic system; and connecting the processor subsystem to a vehicle communication network.

In Example 30, the subject matter of Examples 21-29, further comprising: installing pressure sensors within the region under the vehicle that is configured to become the bounded region; connecting the pressure sensors to the control system; and configuring the control system to adjust fan operation based on pressure measurements from the pressure sensors.

In Example 31, the subject matter of Examples 21-30, wherein mounting the plurality of fans comprises: installing fans with variable blades; and connecting blade adjustment mechanisms to the control system to enable adjustment of blade positions based on operating modes.

In Example 32, the subject matter of Examples 21-31, further comprising: installing a user interface in a cabin of the vehicle; and connecting the user interface to the control system to enable driver selection of operating modes.

In Example 33, the subject matter of Examples 21-32, wherein calibrating the control system comprises: setting threshold values for transitioning between operating modes; configuring deployment positions for the plurality of skirts corresponding to each operating mode; and setting fan power levels corresponding to each operating mode.

In Example 34, the subject matter of Examples 21-33, further comprising: installing filtration mechanisms at inlets of the airflow pathways to prevent debris from entering the fans during operation.

In Example 35, the subject matter of Examples 21-34, further comprising: installing a diagnostic port connected to the control system; and configuring the control system to log operational data to enable performance optimization.

Example 36 is a method of manufacturing a vehicle aerodynamic system, comprising: fabricating one or more fans configured to be positioned in airflow pathways; forming airflow pathways configured to house the one or more fans, wherein at least one airflow pathway is shaped to extend to a region configured to become a bounded region under a vehicle; fabricating a plurality of skirts configured to selectively interact with a ground surface to define the bounded region; forming deployment mechanisms for the plurality of skirts, the deployment mechanisms configured to enable selective deployment and retraction of the skirts; assembling a control system configured to operate the vehicle aerodynamic system in multiple modes; and programming the control system with instructions for operating the vehicle aerodynamic system in at least a first mode and a second mode.

In Example 37, the subject matter of Example 36, wherein fabricating the plurality of skirts comprises: forming side skirts configured to extend along longitudinal sides of the vehicle; forming a front skirt configured to extend across a front portion of the vehicle underside; and forming a rear skirt configured to extend across a rear portion of the vehicle underside.

In Example 38, the subject matter of Examples 36-37, wherein forming deployment mechanisms comprises: fabricating hinge assemblies configured to be attached to at least a subset of the plurality of skirts; and producing actuators configured to control movement of the hinge assemblies.

In Example 39, the subject matter of Examples 36-38, wherein forming deployment mechanisms comprises: fabricating extension mechanisms configured to be attached to at least a subset of the plurality of skirts; and producing actuators configured to control movement of the extension mechanisms.

In Example 40, the subject matter of Examples 36-39, further comprising: fabricating a central skirt configured to divide the region into multiple bounded regions; and forming additional airflow pathways configured to extend to each of the multiple bounded regions.

In Example 41, the subject matter of Examples 36-40, wherein fabricating the plurality of fans comprises: producing central fans configured to be mounted in airflow pathways that extend to the bounded region; and producing outboard fans configured to be mounted in airflow pathways positioned toward sides of the vehicle.

In Example 42, the subject matter of Examples 36-41, further comprising: fabricating a plurality of sensors configured to detect operating conditions of the vehicle; and configuring the control system to receive data from the plurality of sensors for determining skirt configurations.

In Example 43, the subject matter of Examples 36-42, wherein fabricating the plurality of sensors comprises fabricating at least one of: vehicle speed sensors; wheel position sensors; inertial measurement sensors for detecting vehicle pitch and roll; GPS location sensors; or ground proximity sensors.

In Example 44, the subject matter of Examples 36-43, wherein assembling the control system comprises: fabricating a processor subsystem; producing memory storage containing instructions for operating the vehicle aerodynamic system; and configuring the processor subsystem to connect to a vehicle communication network.

In Example 45, the subject matter of Examples 36-44, further comprising: fabricating pressure sensors configured to be installed within the region configured to become the bounded region; and configuring the control system to adjust fan operation based on pressure measurements from the pressure sensors.

In Example 46, the subject matter of Examples 36-45, wherein fabricating the plurality of fans comprises: producing fans with variable blades; and fabricating blade adjustment mechanisms configured to enable adjustment of blade positions based on operating modes.

In Example 47, the subject matter of Examples 36-46, further comprising: fabricating a user interface configured to be installed in a cabin of the vehicle; and configuring the user interface to enable driver selection of operating modes.

In Example 48, the subject matter of Examples 36-47, wherein programming the control system comprises: establishing threshold values for transitioning between operating modes; defining deployment positions for the plurality of skirts corresponding to each operating mode; and setting fan power levels corresponding to each operating mode.

In Example 49, the subject matter of Examples 36-48, further comprising: fabricating filtration mechanisms configured to be installed at inlets of the airflow pathways to prevent debris from entering the fans during operation.

In Example 50, the subject matter of Examples 36-49, further comprising: configuring the control system with data logging capabilities to enable performance optimization.

Example 51 may include an apparatus comprising means to perform one or more elements of a method described in or related to any of the preceding examples or any other method or process described herein.

Example 52 may include one or more non-transitory computer-readable media comprising instructions to cause an electronic device, upon execution of the instructions by one or more processors of the electronic device, to perform one or more elements of a method described in or related to any of the preceding examples, or any other method or process described herein.

Example 53 may include an apparatus comprising logic, modules, or circuitry to perform one or more elements of a method described in or related to any of the preceding examples or any other method or process described herein.

Example 54 may include a method, technique, or process as described in or related to any of the preceding examples or portions or parts thereof.

Example 55 may include an apparatus comprising one or more processors and one or more computer-readable media comprising instructions that, when executed by the one or more processors, cause the one or more processors to perform the method, techniques, or process as described in or related to any of the preceding examples, or portions thereof.

Example 56 may include a signal as described in or related to any of the preceding examples, or portions or parts thereof.

Example 57 may include a datagram, packet, frame, segment, protocol data unit (PDU), or message as described in or related to any of the preceding examples, or portions or parts thereof, or otherwise described in the present disclosure.

Example 58 may include a signal encoded with data as described in or related to any of the preceding examples, or portions or parts thereof, or otherwise described in the present disclosure.

Example 59 may include a signal encoded with a datagram, packet, frame, segment, protocol data unit (PDU), or message as described in or related to any of the preceding examples, or portions or parts thereof, or otherwise described in the present disclosure.

Example 60 may include an electromagnetic signal carrying computer-readable instructions, wherein execution of the computer-readable instructions by one or more processors is to cause the one or more processors to perform the method, techniques, or process as described in or related to any of the preceding examples, or portions thereof.

Example 61 may include a computer program comprising instructions, wherein execution of the program by a processing element is to cause the processing element to carry out the method, techniques, or process as described in or related to any of the preceding examples, or portions thereof.

Example 62 may include a signal in a wireless network, as shown and described herein.

Example 63 may include a method of communicating in a wireless network as shown and described herein.

Example 64 may include a system for providing wireless communication, as shown and described herein.

Example 65 may include a device for providing wireless communication as shown and described herein.

What is claimed is:

1. A vehicle aerodynamic system comprising:
   one or more fans positioned in airflow pathways of a vehicle, at least one airflow pathway extending to a bounded region under the vehicle;
   a plurality of skirts configured to selectively operatively couple with a ground surface to define the bounded region under the vehicle;
   a control system configured to operate the vehicle aerodynamic system in:
      a first mode having a first set of skirts from among the plurality of skirts deployed in a first configuration to create the bounded region under the vehicle with a first fan from among the one or more fans operating through a respective airflow pathway to create low pressure within the bounded region; and
      a second mode having the plurality of skirts form a second configuration different from the first configuration and with at least one of the first fan or a second fan from among the one or more fans operating through a respective airflow pathway.

2. The vehicle aerodynamic system of claim 1, wherein in the second mode, the plurality of skirts that form the second configuration comprises side skirts deployed to interact with the ground surface while front and rear skirts are retracted.

3. The vehicle aerodynamic system of claim 1, further comprising:
   a second bounded region under the vehicle defined by a second set of skirts; and
   a fan from among the one or more fans positioned in an airflow pathway extending to the second bounded region;
   wherein the control system is further configured to selectively operate the fan from among the one or more fans to create low pressure within the second bounded region.

4. The vehicle aerodynamic system of claim 1, further comprising an assembly to selectively retract or deploy one or more skirts from among the plurality of skirts based on an operating mode defined by the control system.

5. The vehicle aerodynamic system of claim 1, wherein the plurality of skirts includes an extension mechanism to selectively retract or deploy one or more skirts from among the plurality of skirts based on an operated mode controlled by the control system.

6. The vehicle aerodynamic system of claim 1, wherein the plurality of skirts are configured to be partially deployed to intermediate positions between a deployed state and a retracted state, and wherein the intermediate positions are determined based on an operating mode defined by the control system.

7. The vehicle aerodynamic system of claim 6, wherein the control system is configured to:
determine the operating mode from a plurality of operating modes based on one or more operating conditions;
calculate a partial deployment position for at least one of the plurality of skirts based on the operating mode; and
actuate the at least one of the plurality of skirts to the partial deployment position.

8. The vehicle aerodynamic system of claim 1, wherein the control system is configured to deploy or retract the plurality of skirts based on one or more of:
GPS location;
a current vehicle speed;
wheel position sensor data;
vehicle pitch; or
vehicle roll.

9. The vehicle aerodynamic system of claim 1, further comprising a ground proximity detection system configured to:
measure a distance between the vehicle and the ground surface using one or more sensors; and
communicate the measured distance to the control system, wherein the control system is further configured to adjust deployment of one or more of the plurality of skirts based on the measured distance.

10. The vehicle aerodynamic system of claim 1, wherein the control system is configured to operate the one or more fans at power levels corresponding to:
a first power level in the first mode; and
a second power level in the second mode.

11. A method of operating a vehicle aerodynamic system, comprising:
receiving, by a control system, sensor data indicating at least one operating condition of a vehicle having one or more fans positioned in airflow pathways, at least one airflow pathway extending to a bounded region under the vehicle;
determining, by the control system based on the received sensor data, a skirt configuration for a plurality of skirts that selectively operatively couple with a ground surface;
actuating, by the control system, the plurality of skirts based on the determined skirt configuration;
activating, by the control system in a first mode, a first fan from among the one or more fans through a respective airflow pathway to create low pressure within the bounded region when the plurality of skirts are in a first configuration; and
activating, by the control system in a second mode, at least one of the first fan or a second fan from among the one or more fans through a respective airflow pathway when the plurality of skirts form a second configuration different from the first configuration.

12. The method of claim 11, wherein in the second configuration, the plurality of skirts comprises side skirts deployed to interact with the ground surface while front and rear skirts are retracted.

13. The method of claim 11, further comprising:
defining, by the control system, a second bounded region under the vehicle using a second set of skirts;
activating, by the control system, a fan from among the one or more fans positioned in an airflow pathway extending to the second bounded region to create low pressure within the second bounded region.

14. The method of claim 11, wherein actuating the at least one of the plurality of skirts comprises controlling an assembly to selectively retract or deploy the at least one of the plurality of skirts based on the determined skirt configuration.

15. The method of claim 11, wherein actuating the at least one of the plurality of skirts comprises controlling an extension mechanism to selectively retract or deploy the at least one of the plurality of skirts based on the determined skirt configuration.

16. The method of claim 11, wherein actuating the at least one of the plurality of skirts comprises partially deploying the at least one of the plurality of skirts to an intermediate position between a deployed state and a retracted state based on the determined skirt configuration.

17. The method of claim 16, wherein determining the skirt configuration comprises:
determining an operating mode from a plurality of operating modes based on the received sensor data;
calculating a partial deployment position for the at least one of the plurality of skirts based on the operating mode.

18. The method of claim 11, wherein the received sensor data comprises at least one of:
GPS location data;
vehicle speed data;
wheel position sensor data;
vehicle pitch data; or
vehicle roll data.

19. The method of claim 11, wherein:
the received sensor data comprises distance measurements between the vehicle and the ground surface; and
determining the skirt configuration comprises adjusting deployment positions of one or more of the plurality of skirts based on the distance measurements.

20. The method of claim 11, wherein:
activating the first fan in the first mode comprises operating the first fan at a first power level; and
activating the first fan in the second mode comprises operating the first fan at a second power level.

* * * * *